W. H. HENNAMAN & W. F. SHAW, Jr.
Boiling-Pot.

No. 166,102.  Patented July 27, 1875.

WITNESSES:

INVENTOR:
W. H. Hennaman
Wm. F. Shaw Jr.
BY
ATTORNEYS.

UNITED STATES PATENT OFFICE.

WILLIAM H. HENNAMAN AND WILLIAM F. SHAW, JR., OF BALTIMORE, MD.

IMPROVEMENT IN BOILING-POTS.

Specification forming part of Letters Patent No. 166,102, dated July 27, 1875; application filed June 24, 1875.

*To all whom it may concern:*

Be it known that we, WM. H. HENNAMAN and WM. F. SHAW, Jr., of Baltimore city, State of Maryland, have invented a new and Improved Boiling-Pot; and we do hereby declare that the following is a full, clear, and exact description of the same, reference being had to the accompanying drawing, forming a part of this specification, in which—

Figure 1:
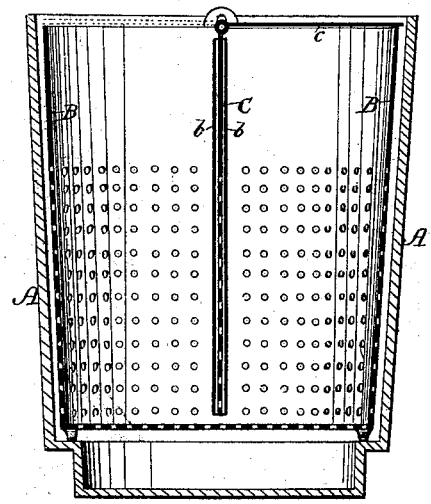
Figure 2:
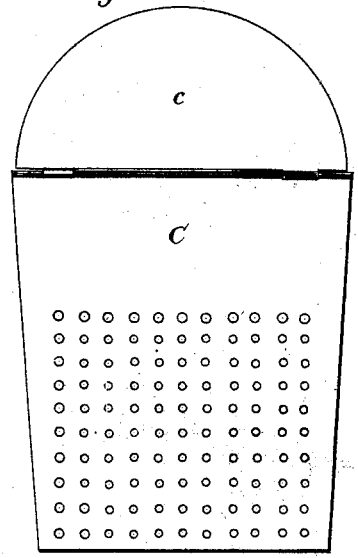
Figure 3:
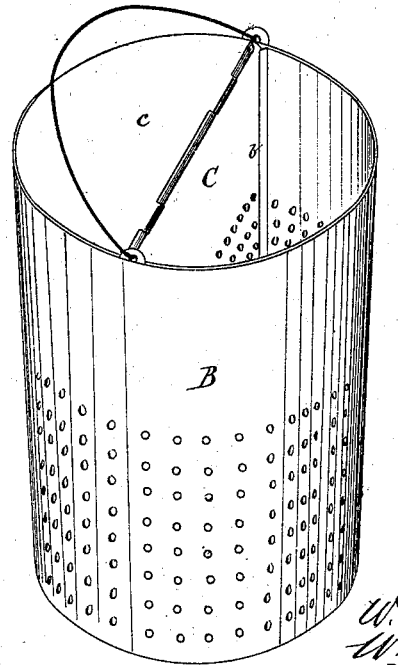

Figure 1 is a sectional elevation of an ordinary boiling-pot; Fig. 2, a side elevation of a perforated partition; Fig. 3, a perspective view of the holder.

The invention relates to the vessels in which vegetables, meats, &c., are boiled on a stove or range; and consists in an improvement of those now known to the public, as hereinafter described and claimed.

A represents the ordinary boiler, which sits upon the stove or range, and B a foraminous holder, in which the vegetables or meats are placed. We make an internal vertical flange-groove, $b$, on each side, and a detachable perforated diaphragm, C. To the top of the latter is hinged a semicircular section-plate, $c$. By this means two kinds of vegetables or meats may be boiled in the same vessel B, while, by turning the section-plate $c$ successively over each side, and holding it with the hand, the separate chambers may be emptied without mixing their contents. By removing the diaphragm the two chambers are thrown into one.

Under circumstances where the cooking and apparatus for effecting it are large we contemplate making the vessels B preferably of rectangular form, and using a multiplicity of them, employing the dividing-diaphragms in the same manner.

We are aware that it is not new to make a fixed or detachable diaphragm in a boiling-pot, nor to use a sector-cover, first over one section and then over another, in pouring out the contents; but

What we claim is—

A boiling-pot provided with a sectional cover hinged to the top of a vertical partition, as and for the purpose specified.

WM. H. HENNAMAN.
WM. F. SHAW, JR.

Witnesses:
SOLON C. KEMON,
CHAS. A. PETTIT.